(No Model.) 4 Sheets—Sheet 1.
E. A. HERMANN.
AUTOMATIC ELECTRIC SIGNALING DEVICE FOR CROSSINGS.
No. 518,525. Patented Apr. 17, 1894.
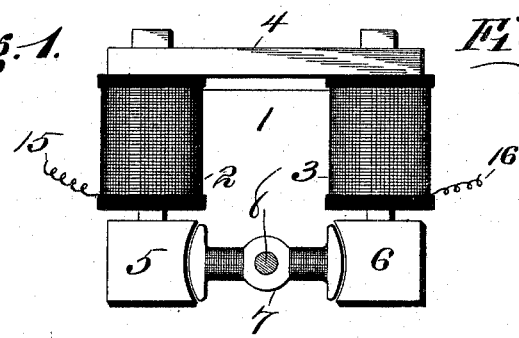
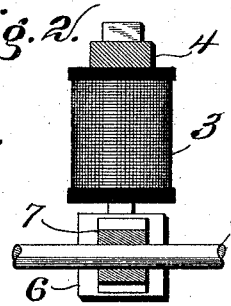
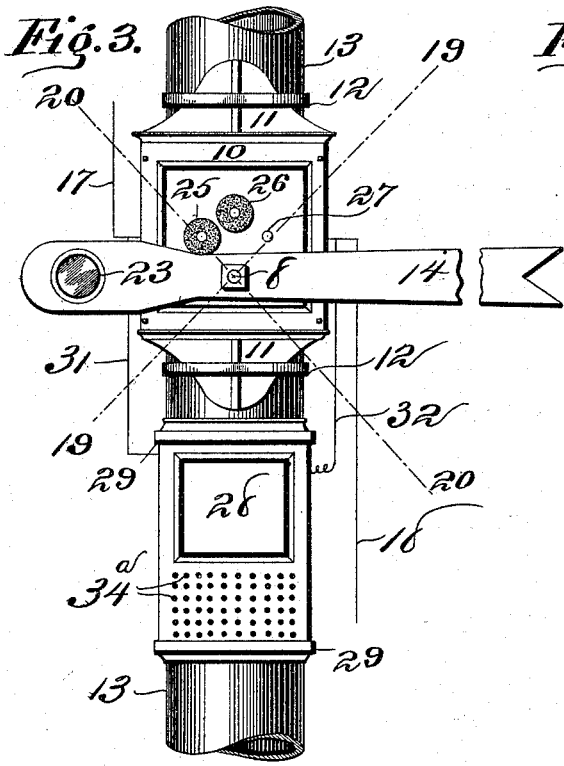
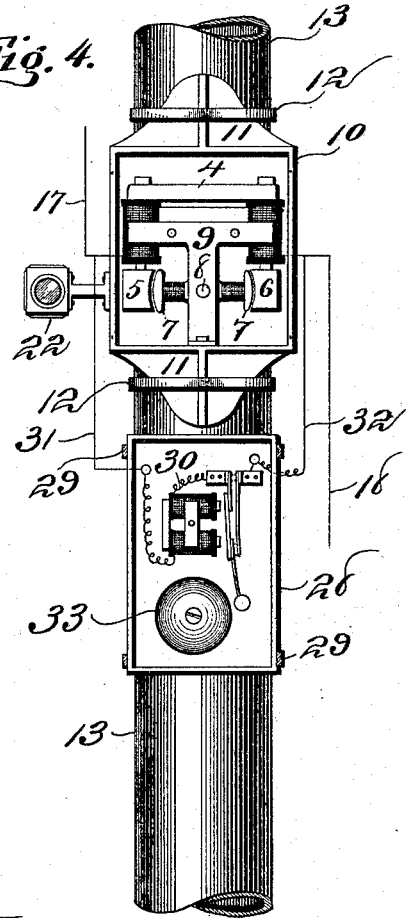
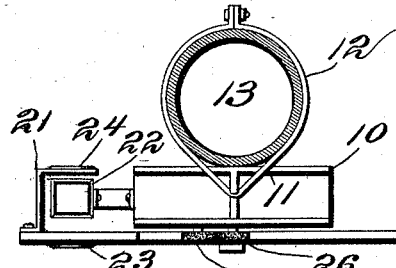
Witnesses:
W. J. Sankey
M. P. Smith
Inventor: Edward A. Hermann
by Higdon Higdon Longan
Attorneys.

(No Model.) 4 Sheets—Sheet 2.
E. A. HERMANN.
AUTOMATIC ELECTRIC SIGNALING DEVICE FOR CROSSINGS.
No. 518,525. Patented Apr. 17, 1894.
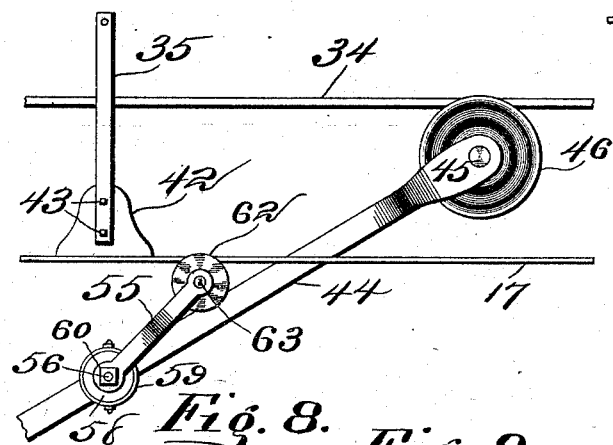
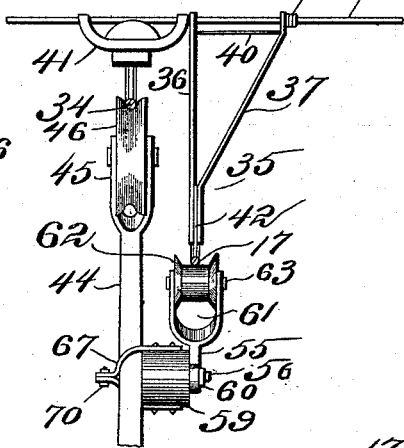
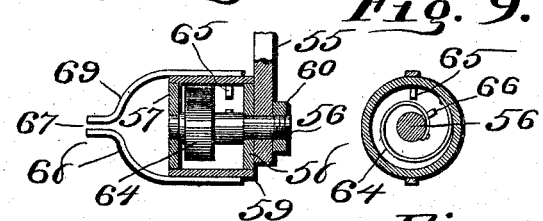
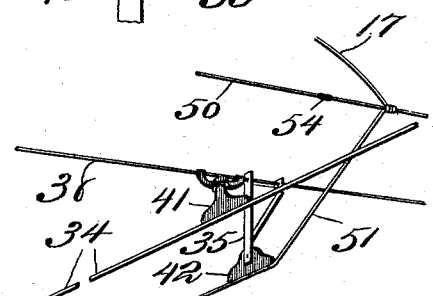
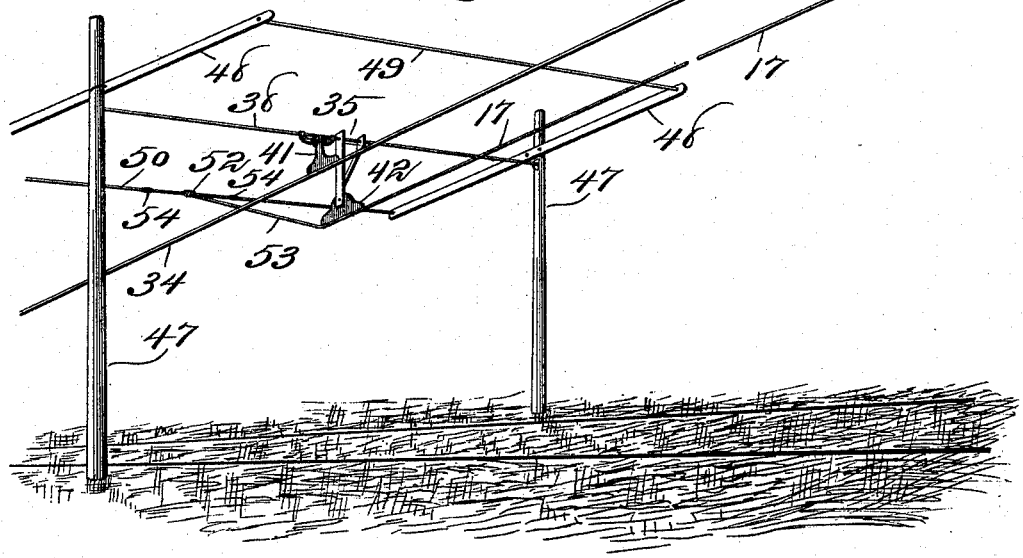
Witnesses:
W. J. Sankey.
M. Griffin.
Inventor: Edward A. Hermann
by Higdon Higdon Longan
Attorneys.
THE NATIONAL LITHOGRAPHING COMPANY,
WASHINGTON, D. C.

(No Model.)  4 Sheets—Sheet 3.

E. A. HERMANN.
AUTOMATIC ELECTRIC SIGNALING DEVICE FOR CROSSINGS.

No. 518,525. Patented Apr. 17, 1894.

Witnesses:
W. J. Sankey,
F. T. Bunyan,

Inventor: Edward A. Hermann
by Higdon Higdon Longan
Attorneys.

THE NATIONAL LITHOGRAPHING COMPANY,
WASHINGTON, D. C.

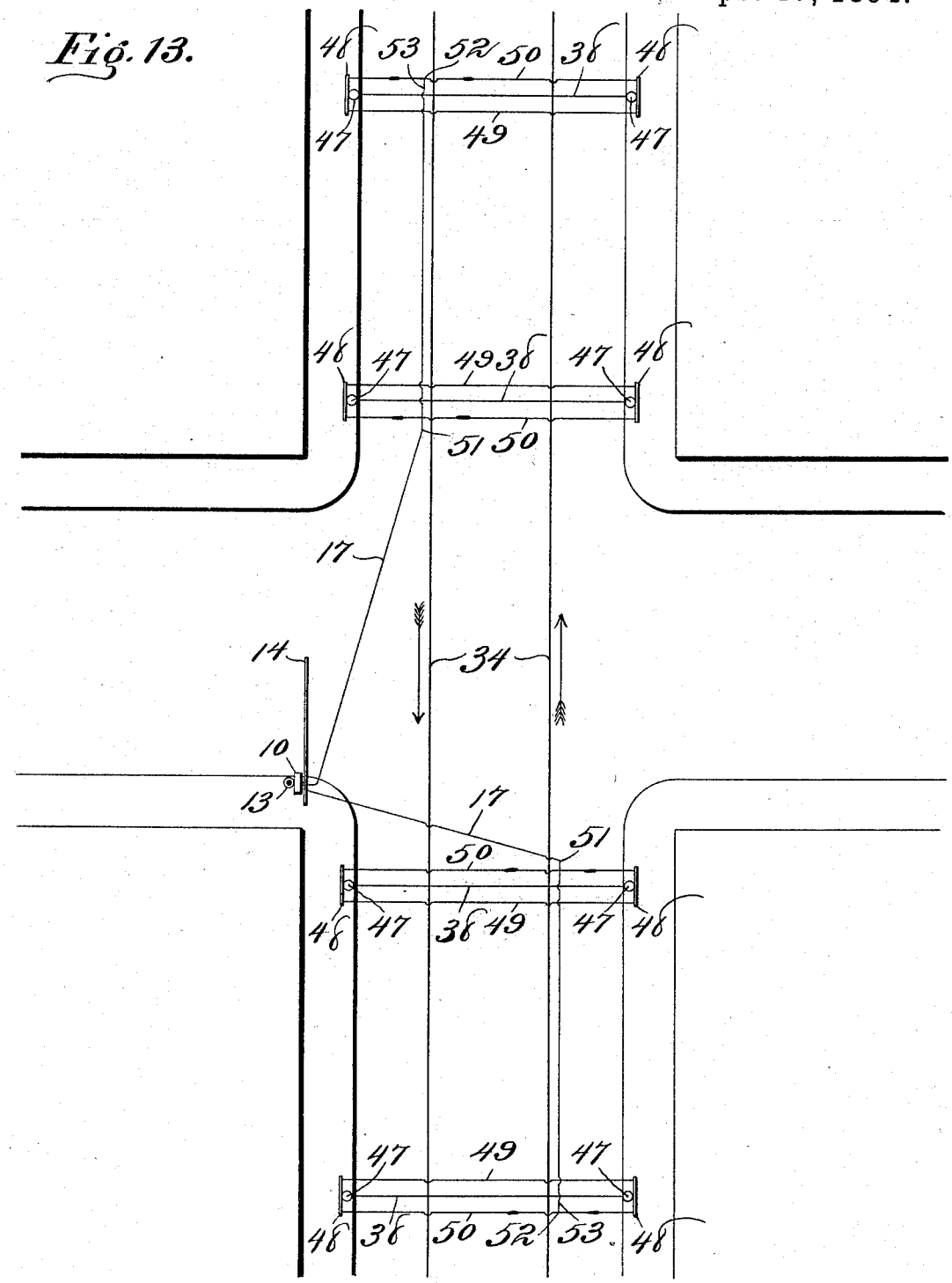

UNITED STATES PATENT OFFICE.

EDWARD A. HERMANN, OF ST. LOUIS, MISSOURI.

AUTOMATIC ELECTRIC SIGNALING DEVICE FOR CROSSINGS.

SPECIFICATION forming part of Letters Patent No. 518,525, dated April 17, 1894.

Application filed September 25, 1893. Serial No. 486,446. (No model.)

*To all whom it may concern:*

Be it known that I, EDWARD A. HERMANN, of St. Louis, State of Missouri, have invented certain new and useful Improvements in Automatic Electric Signaling Devices for Crossings, of which the following is a full, clear, and exact description, reference being had to the accompanying drawings, forming a part hereof.

My invention relates to an automatic electric signaling device, and consists in the novel construction, combination and arrangement of parts hereinafter described, designated in the claims, and illustrated in the accompanying drawings, in which—

Figure 11:
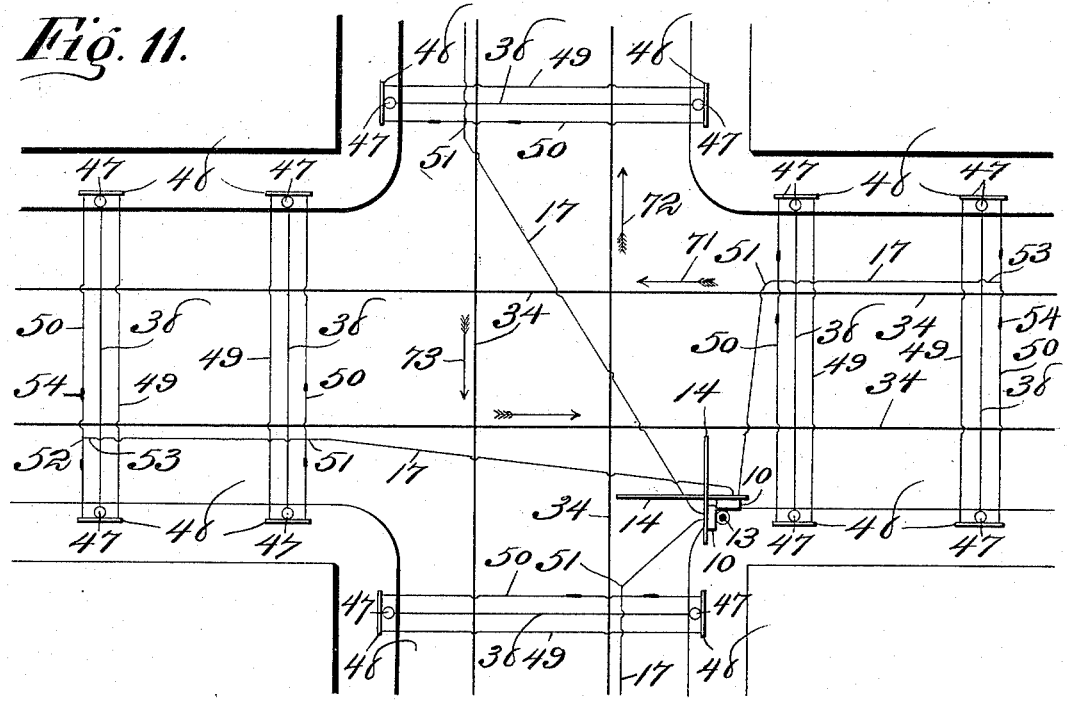
Figure 12:
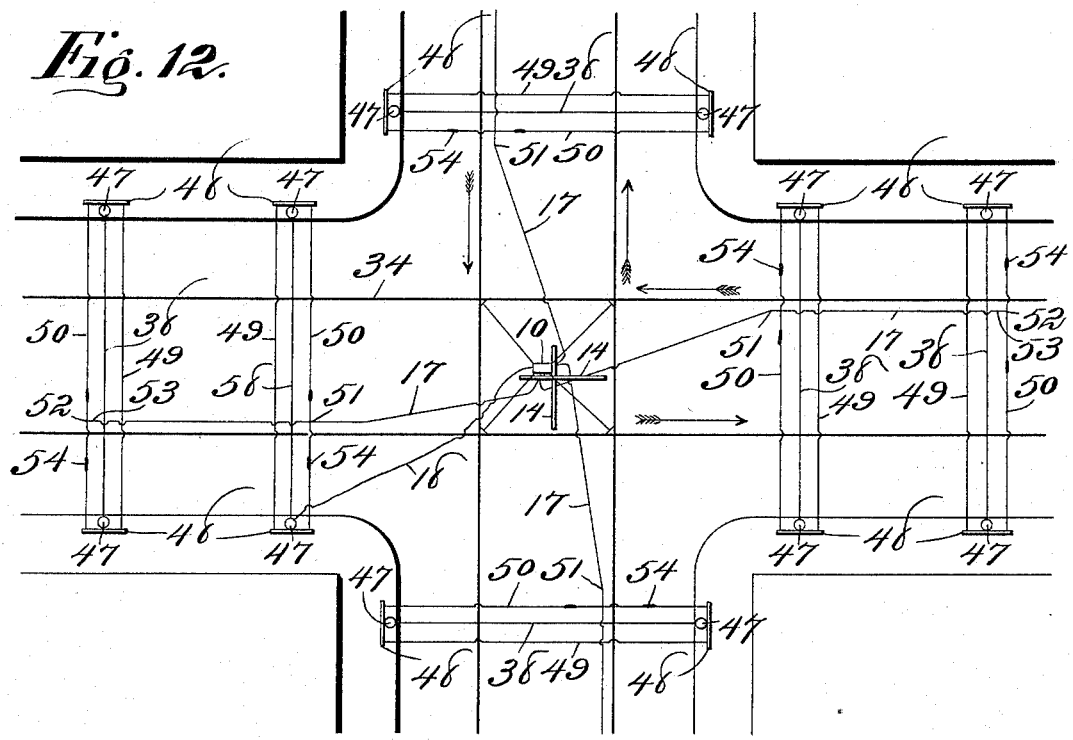

Figure 1 is a side elevation of an electro-magnet, which I make use of in carrying out my invention. Fig. 2 is a vertical transverse section of the magnet, more clearly showing the construction of same. Fig. 3 is a side elevation of a portion of the supporting post having my improved signaling apparatus connected thereto. Fig. 4 is a like view, but having the front covers of the boxes in which my improved signaling apparatus is inclosed, removed to more clearly show the construction of the same, said view also showing a signal bell, which is made use of in carrying out my invention. Fig. 5 is a plan view of my improved signaling device. Fig. 6 is a side elevation of the trolley and a portion of the trolley-pole, showing the connection of the signal-contact-trolley therewith, and also showing a portion of the main wire and the bracket which supports said signal wire. Fig. 7 is a side elevation, more clearly showing the parts illustrated in Fig. 6. Fig. 8 is a sectional view of a casing, which is adjustably mounted upon the trolley-pole, and to which one end of the contact-trolley is connected, a spring being located in said casing for retaining said trolley in contact with the signal-wire. Fig. 9 is a sectional view of the casing illustrated in Fig. 8, more clearly showing the spring. Fig. 10 is a perspective view, showing the manner in which the trolley-wire and the signal wire are supported by the poles. Fig. 11 is a diagram of a double track crossing, showing the arrangement and location of the signal wires with the signaling devices located at one corner of the block. Fig. 12 is a diagram of a double track crossing, showing the location of the signal wires, when the signaling device is located above the center of the tracks. Fig. 13 is a diagrammatic view of a double track, showing the manner in which the signal wires are connected to the signaling device, when said signaling device is placed at one corner of the block.

The object of my invention is to construct a semaphore that, when connected to the armature-shaft of the magnet, and said magnet is energized by a current of electricity, said semaphore will be swung out over the street, or other path of traffic and display a light to indicate danger.

A further object of my invention is to construct a device to automatically indicate the approach of a car or other vehicle propelled by electric power at a railway, street or road crossing, at a curve, bridge or other point where vehicles or pedestrians cross the track.

A further object of my invention is to construct a signaling device to be placed adjacent electric railway crossings, or places where vehicles or pedestrians cross the track, to indicate the approach of a car, thus doing away with flagmen at these points.

My invention will replace the unreliable and expensive system of employing flagmen at crossings, and permit the operators of the cars to continue at their regular rate of speed beyond the point of the signal, or stop to reduce the speed at the point of the signal as rules or circumstances may require; the position of the signal removing all uncertainty whether to stop, reduce speed, continue unchecked and avoid all unnecessary delay.

Referring to the drawings: the numeral 1 designates the electro-magnet, which is constructed of two field magnets 2 and 3, they being engaged at their upper ends by a connecting-plate 4, said plate being insulated from said field magnets.

5 and 6 indicate the poles which are connected to the magnets in any well known manner, and between these poles revolves the armature 7, which is mounted on the armature-shaft 8, having its bearings in the frame 9. Said frame also supports the field magnets in the required position for operation.

The electro-magnet and the frame 9, which supports it, is located in a suitable inclosure or box 10, which is constructed with parallel sides, and the rear side of said inclosure is constructed at each end with an ear or projection 11, which is engaged by a clamp 12 for connecting said box or inclosure with the post 13. The front side of the inclosure or box 10 is detachable, so that access can be had to the electro-magnet for repairing the same, in case it becomes inoperative.

The electro-magnet 1 and the armature-shaft 3 are insulated from each other, one end of said shaft passing through a suitable opening formed in the front side of the inclosure 10, so that the semaphore or arm 14 can be rigidly connected to said shaft.

The field-coil wires 15 and 16 are attached to the signal-wire 17 and ground-wire 18 respectively, or vice versa, depending whether it is desired to turn the semaphore to the position illustrated by the dotted line 19, or the dotted line 20, when an electric current is made to pass through the electro-magnet.

The semaphore or arm 14 is preferably formed as illustrated in Fig. 3, but the construction can be changed to a disk, or any other suitable signal may be used without materially altering my invention.

The semaphore 14 is rigidly connected to the armature-shaft 8, as hereinbefore described, and projects to the right from said shaft a greater distance than to the left. It projects to the left a suitable distance to support a bracket 21, which telescopes a lamp 22 when said semaphore is in the position illustrated in Fig. 3. This lamp 22 is connected to the adjacent side of the inclosure 10 in horizontal alignment with the armature-shaft 8, so that when the semaphore is in a horizontal position the lamp will be covered by the bracket 21 and the end of said semaphore which carries said bracket. A glass 23 is located in a suitable opening in the semaphore, and a glass 24 is located in, and carried by the bracket 21, so that when said semaphore is in a horizontal position, the light reflected from the lamp 22 will pass through said glasses 23 and 24. These glasses are preferably colored red, which indicates danger, as the semaphore is brought into a horizontal position when a current of electricity passes through the electro-magnet.

An incandescent lamp may be substituted for the lamp 22, and is preferably made of white glass, so that a white light will appear at all times when the semaphore is either in the position of the dotted line 19 or 20, and a red light never appears until the semaphore is caused to assume a horizontal position by a current of electricity, which never occurs unless a car is approaching, the lamp 22 being used only at night, as the semaphore 14 is of such a size and located in such a position that it can be readily seen by day when in a horizontal position.

For limiting the downward movement of the long portion of the semaphore 14, I have constructed a rubber ring or stop 25, which is connected to the front side of the inclosure 10 at the left of the armature-shaft 8, and in such a position that it will be engaged by the semaphore when it assumes a horizontal position, and retain it in said position until the electric current has been opened. A rubber ring or stop 26, the same in construction as the ring 25, is connected to the front side of the inclosure 10 in vertical alignment with the armature-shaft, and in such a position that when the semaphore reaches the position of the dotted line 19, it will come in contact with said ring or stop, which will prevent further movement in this direction. When the semaphore is constructed to swing up, the ring or stop 25 is placed in the position illustrated in Fig. 3, and in case it is desired to have it swing down, the shaft, carrying said ring is detached from the front side of the inclosure and placed at 27.

The object of having the semaphore either swing up or down is for convenience; for instance, if it be connected to a pole and the semaphore swung up, it would come in contact with telephone wires, or other obstructions.

The shaft carrying the stop 25 can be placed at 27, and the connection of the field wires changed, which will cause the semaphore to swing down.

28 indicates a box or inclosure, which is connected to the post 13 beneath and adjacent the inclosure 10, and is held in contact with said post by suitable clamps 29. Located in the upper end of this box or inclosure is an electro-magnet 30, energized by a contact 31 leading from the signal-wire 17 and a contact 32 leading from the ground-wire 18, or vice versa. The electro-magnet is constructed in the ordinary manner to ring a bell 33, which is located in the lower end of the inclosure 28. The front side of the inclosure 28 is constructed adjacent its lower end with a series of apertures $34^a$, so that the sound reverberating from the bell can pass out through said apertures. This bell signal may be omitted when a visible signal only is desired, or if an audible signal only is desired, the visible signal may be omitted, and the signal wire 17 and ground wire 18 attached directly to the ends of the electro-magnet 30 in the box 28. For supporting the signal wire 17 parallel with the main conductor or trolley-wire 34, I have provided a bracket 35, which is constructed of two bars 36 and 37, they being connected to the span-wire 38 at their upper ends and prevented from slipping on said wire by a coil 39 tightly wound upon said span-wire adjacent the bar 37 of the bracket 35. For holding the upper ends of said bars 36 and 37 the required distance apart, I have constructed a bar 40, but any other suitable device may be substituted. The bar 36 of the bracket 35 is prevented from longitudinal movement on the span-wire 38 by a clamp 41, to which the trolley-wire or conductor 34 is connected. The bar 36 of the bracket 35 is vertical, while the lower end of the bar 37 of said bracket is connected to said bar 36 and extends at an angle upward therefrom, so that when its upper end is connected to the span-wire 38, it will form a brace.

Clamped between the lower end of the bars 36 and 37 is an ear 42, to which the signal-wire 17 is connected. The signal-wire 17 may be insulated from the ear 42 by slightly lengthening the bolts 43 which hold said ear between the bars 36 and 37 of the bracket 35, and placing between said ear and said bars a thin piece of insulated material.

44 designates the trolley-pole which is preferably made of metal, and its upper end bifurcated so as to form ears 45, and placed in the bifurcation is the trolley-wheel 46 of ordinary construction, which comes in contact with the trolley-wire 34.

The trolley-pole 44 can be of any ordinary construction, but preferably metal, and connected to the car in any well known manner. If made of wood a suitable conductor is connected in such a manner as to come in contact with the trolley-wheel and lead to the motor of the car.

By the construction of the brackets 35, the signal-wire 17 will be parallel with the trolley-wire 34 and a little to one side of a vertical line from said trolley-wire, so that the trolley-pole can pass it without coming in contact therewith.

The ends of the span-wire 38 are connected to the vertical-poles 47 which are located on opposite sides of the track, and in such a position that said span-wire will project across the track at a right angle therewith.

Connected to each of the poles 47 is a horizontal arm 48, which projects both ways from said pole, and located in such a position that the arm connected to one pole will be parallel with the arm connected to the pole on the opposite side of the track.

Connected to the ends of the bars 48 are guy-wires 49 and 50, and the adjacent end of the signal-wire 17 is connected to the guy-wire 50; said guy-wire being located parallel with the span-wire 38 and a distance from it, there will be an incline from the bracket 35, which supports said signal-wire to the guy-wire 50. This incline is constructed by the bracket 35 supporting the signal-wire at a distance below the span-wire, so that when the end of said signal-wire is connected to the guy-wire 50, the wire will be on an incline between said bracket and said guy-wire.

The signal-wire 17 may be of any desired length and is preferably of smaller section, or made of material of greater resistance to the electric current than the trolley-wire 34. One end of it is attached to the field-coil wire of the electro-magnet 1 in the inclosure 10, thence passes to the guy-wire 50 which is located a suitable distance back from the bracket 35, so that when said guy-wire 50 is passed under the lower end of said bracket, there will be an incline between said guy-wire and said bracket. I will designate this incline by the numeral 51. This incline is termed the "run-off;" that is, this is the point where the signal-trolley leaves the signal-wire 17. After the signal-wire 17 has been passed over and connected to the lower end of the bracket 35, it extends along parallel with the trolley-wire to another bracket 35, and is supported any suitable distance back from the first mentioned bracket 35. The signal-wire, after passing over the bracket, extends up on an incline, and is connected to the guy-wire 50 at 52. By this construction there will be an incline 53 formed by the signal-wire 17 between the bracket 35 and the point 52 where said signal-wire is connected to the guy-wire 50. This incline will be termed the "run-on" point, as this is the point where the signal-trolley first comes in contact with the signal-wire 17 when a car is approaching the crossing where the signal is located.

Insulators 54 are placed upon the guy-wires 50 on both sides of the point where the signal-wire 17 is connected thereto to prevent the electric current from being carried off by said guy-wires.

When a long and more gradual run-on than 53 is desired, the ends of the horizontal arms, which support the guy-wires 50, may be longer which will cause the incline 53 to be more gradual when the signal-wire 17 is connected to the guy-wire 50.

The signal-wire 17 is supported a sufficient distance below the trolley-wire 34 that the signal-trolley-wheel will not strike any span-wire, clamp, frog, switch, &c., attached to the trolley-wire when the signal trolley is at a vertical position, or nearly so, as the spring actuating said trolley forces it up in a vertical position after it has left the run-off 51.

55 designates the signal-trolley, the lower end of which is connected to a horizontal shaft 56 having its bearings in the ends 57 and 58 of the cylindrical casing 59. Said contact-trolley is held in connection with the shaft 56 by a nut 60. The free end of the signal-trolley 55 is constructed with a bifurcation 61, in which is located the contact-trolley-wheel 62, and is held in position with the trolley 55 by a horizontal shaft 63. For holding said signal-trolley in contact with the signal-wire 17, at all times, when said trolley is passing from the run-on 53 to the run-off 51, I have constructed a spring 64, one end of which is connected to the shaft 56 and passes around said shaft, and is then connected to the inner surface of the cylindrical-casing 59. This spring is for holding the signal-trolley-wheel 62 in contact with the signal-wire 17 and allow the end of the trolley 55, which carries the trolley-wheel 62, to yield to any irregularity in the signal-wire 17. To prevent the spring 64 from throwing the trolley 55 past a vertical position when it leaves the run-off 51, I have constructed a lug or projection 65 on the inner surface of the cylindrical casing 59, and a lug or projection 66 on the shaft 56 so that when the trolley 55 is thrown up into a vertical position, the lug or projection 66 will come in contact with the lug or projection 65 and prevent said trolley from passing a vertical point. The cylindrical casing 59, which supports the bearings for the signal-trolley 55, is connected to the trolley-pole 44 by a clamp 67. This clamp is constructed of two bars 68 and 69. One end of each of said bars is connected to the outer surface of the cylindrical casing, and the free ends are passed over the trolley-pole 44 and bent so that their free ends will be located adjacent each other and clamp said trolley-pole when a bolt 70 is passed through suitable apertures in the free ends of said bars, and they are drawn together by said bolt.

Referring now to Fig. 11, I have shown a double track electric railway crossing with the boxes 10 which support the signal-arm or semaphore 14 at a point at one corner of the crossing, and the semaphores so arranged that the signal-trolley 55, carried by the car coming from the direction indicated by the arrow 71, will come in contact with the signal-wire 17 at the run-on 53, which will cause the semaphore 14 to assume a horizontal position, and thus warn the cars coming from the direction indicated by the arrows 72 and 73 of such approach.

Referring now to Fig. 12, the box or inclosure 10 is located in the center of the crossing and supported by suitable guy-wires leading to suitable supports. When the device is so arranged, there are two electro-magnets placed within the inclosure 10, it being of such size as to allow said magnets to be placed therein, and the armature-shafts carried by said electro-magnets project from the inclosure at right angles, so that the semaphores will also be at right angles relative to each other. The signal-wires 17 are connected to the electro-magnets in such a manner that one of said semaphores will swing down when the car passes the run-off 51, and the other semaphore will swing up after said car has passed the run-off, thus allowing both semaphores to be connected to the same box or inclosure without coming in contact with each other when the electro-magnets are energized.

The operation is as follows: When a car or other electric vehicle arrives at the run-on 53 of the signal-wire 17, the signal-trolley-wheel 63 is pressed against it and completes an electric circuit from the trolley-wheel 46 to the trolley-pole 44; thence through the signal-trolley 55 to the signal-trolley-wheel 62; thence along the signal-wire 17 to the field-coils of the electro-magnet 1, thereby energizing it and turning the armature 7 and the semaphore or arm 14, or other signal, fastened to the armature-shaft 8, thence through the ground-wire 18 to the ground, or to the return circuit. The electro-magnet 1 is thereby placed parallel with the electric circuit through the trolley-wire and ground or return wire, when one is used. When the car arrives at the other end of the signal-wire 17, the signal-trolley 55 is passed off of the signal-wire at the run-off 51, thus interrupting the electric current through the signal-wire 17. When the current through this wire ceases, the electro-magnet 1 is demagnetized, and the semaphore 14, or other signal, returns to its normal position. The usual position of this signal when there is no current passing through the electro-magnet 1 is on the line 19 or 20, as may be desired; preferably the latter when fixed high above the ground, or to the former when near enough to the ground that the end will not strike a person, animal, wagon, or other object when the end of said semaphore projects toward the ground. Usually the end of the semaphore or signal-arm 14, which carries the bracket 21, is constructed with a weight to balance the other end of the signal, and draw said signal up as indicated by the dotted line 19 after the electric current has passed through the electro-magnet 1. The semaphore or arm 14 being drawn down in a horizontal position, when a car approaches, it causes a current of electricity to pass through the electro-magnet 1, which will turn the signal to a horizontal position, and holds it there as long as the current continues to flow; but when released, the weight carried by the end of the semaphore draws the signal-arm up to the position of the dotted line 19—19. On double track electric railways, the signal-wire 17 leads to and connects with one of the field-coils of the electro-magnet 1, and a signal-wire connects to the other end of the field-coil wire; therefore, a car on either track approaching a crossing, or other point where a signal is located, will cause a current of electricity to flow through the electro-magnet and operate a signal, and continues to hold it in the danger position until either car has passed the run-off of the signal-wire, and if both cars should be in connection with their respective signal-wires at the same time, the signal will continue in its danger position until both cars have passed their respective run-offs. The electric bell is operated by a part of the electric current which flows through the signal-wire 17, and is shunted therefrom around the signal-box or inclosure 10 by wires attached to the signal-wire 17 and ground-wire 18. The bell may be omitted where an audible signal is not desired.

What I claim is—

1. In an automatic signaling device, an electro-magnet mounted in a box or inclosure constructed to be connected to a pole, a semaphore or arm having a bracket connected to one end, carried by the armature-shaft of said electro-magnet, detachable stops or rings connected to the front side of said inclosure for limiting the movement of said arm or semaphore, and electrical conductors leading to and from said electro-magnets for energizing the armature for operating said semaphore or arm, substantially as set forth.

2. In an electric signaling device, an electro-magnet mounted in a suitable inclosure, in combination with a post or support, an arm having a suitable aperture and a glass located in one end carried by the armature-shaft of the electro-magnet, a lamp connected to one side of said inclosure in such a position that when the arm is in a horizontal position the light reflecting from said lamp will pass through the glass in the end of said arm, detachable stops or rings connected to the front of said inclosure for limiting the movement of the semaphore or arm, a box or inclosure having an electro-magnet and a bell located therein beneath the first mentioned box carrying the arm, and electrical conductors leading to and from said boxes for energizing the electro-magnets therein for moving the arm or semaphore and ringing the bell, substantially as set forth.

3. In combination with a trolley-pole, a casing having a rock-shaft mounted therein, a signal-trolley connected to said shaft, a trolley-wheel revolubly mounted in a bifurcation formed in said last mentioned trolley, a spring connected to said shaft and said casing for holding said trolley-wheel in contact with the signal-wire from the time it reaches the run-on until it reaches the run-off, a lug or projection connected to the interior of said casing, and a lug or projection connected to the shaft for engaging the first mentioned lug or projection and prevent the spring from throwing the signal-trolley past a vertical plane, substantially as set forth.

In testimony whereof I affix my signature in presence of two witnesses.

EDWARD A. HERMANN.

Witnesses:
W. J. SANKEY,
JNO. C. HIGDON.